United States Patent
Shimazawa et al.

(10) Patent No.: US 6,413,325 B1
(45) Date of Patent: Jul. 2, 2002

(54) METHOD FOR MANUFACTURING THIN-FILM MAGNETIC HEAD

(75) Inventors: Koji Shimazawa; Satoru Araki; Haruyuki Morita, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/433,217

(22) Filed: Nov. 4, 1999

(30) Foreign Application Priority Data

Nov. 5, 1998 (JP) .......................................... 10-328817

(51) Int. Cl.⁷ ................................................. C21D 1/04
(52) U.S. Cl. .................................... 148/108; 29/603.08
(58) Field of Search ........................ 148/108; 29/603.08

(56) References Cited

U.S. PATENT DOCUMENTS

| | | |
|---|---|---|
| 5,206,590 A | 4/1993 | Dieny et al. |
| 5,422,571 A | 6/1995 | Gurney et al. |
| 5,772,794 A * | 6/1998 | Uno et al. .................. 148/108 |
| 6,074,707 A * | 6/2000 | Nakazawa et al. .......... 427/547 |
| 6,123,781 A | 9/2000 | Shimazawa ................. 148/108 |

FOREIGN PATENT DOCUMENTS

JP         10-223942        8/1998

OTHER PUBLICATIONS

Shimazawa, K. et al., "Canting of exchange coupling direction in spin valve with various pinned layers", Apr. 15, 1999; *Journal of Applied Physics*, vol. 85, No. 8, pp. 4973–4975.
U.S. Patent Application No. 09/215,538 for "Method for Manufacturing Thin–Film Magnetic Head with Spin Valve Magnetoresistive Sensor", Filed Dec. 18, 1998; Shimazawa et al.; Pat. No. 6,302,970 issued Oct. 16, 2001.
U.S. Patent Application No. 09/262,314 for "Magnetoresistive Effect Multi–Layered Structure and Thin–Film Magnetic Head with the Magnetoresistive Effect Multi–Layered Structure", Filed Mar. 4, 1999; Shimazawa et al.
U.S. Patent Application No. 09/272,295 for "Method for Manufacturing Thin–Film Magnetic Head with Magnetoresistive Effect Multi–Layered Structure", Filed Mar. 19, 1999; Shimazawa et al.
U.S. Patent Application No. 09/498,349 for "Magnetoresistive Effect Sensor and Manufacturing Method of the Sensor", Filed Feb. 4, 2000; Shimazawa et al.

* cited by examiner

*Primary Examiner*—John Sheehan
*Assistant Examiner*—Andrew L. Oltmans
(74) *Attorney, Agent, or Firm*—Arent Fox Kintner Plotkin & Kahn, PLLC

(57) ABSTRACT

A method of manufacturing a thin-film magnetic head with a SVMR element which includes first and second layers of a ferromagnetic material (free and pinned layers) separated by a layer of non-magnetic electrically conductive material, and a layer of anti-ferromagnetic material formed in physical contact with the pinned layer. The method has a first temperature annealing (pin annealing) step of annealing the SVMR element under application of magnetic field to provide exchange coupling between the pinned layer and the anti-ferromagnetic material layer so that the pinned layer is pinned toward a predetermined direction, and a second temperature annealing (free layer annealing) step of annealing the SVMR element so that axis of easy magnetization of the free layer orients a direction substantially perpendicular to the predetermined direction. The free layer annealing is performed at a temperature lower than 150° C.

12 Claims, 11 Drawing Sheets

METHOD FOR MANUFACTURING THIN-FILM MAGNETIC HEAD

FIELD OF THE INVENTION

The present invention relates to a method for manufacturing a thin-film magnetic head equipped with a spin valve magnetoresistive effect (SVMR) element utilizing the giant magnetoresistive effect (GMR), used for a hard disc drive (HDD) unit.

DESCRIPTION OF THE RELATED ART

Recently, thin-film magnetic heads with magnetoresistive effect (MR) read elements based on spin valve effect of GMR characteristics are proposed (U.S. Pat. Nos. 5,206,590 and 5,422,571) in order to satisfy the requirement for ever increasing data storage densities in today's magnetic storage systems like HDD units. The SVMR element includes first and second thin-film layers of a ferromagnetic material separated by a thin-film layer of non-magnetic and electrically conductive material, and an adjacent layer of anti-ferromagnetic material is formed in physical contact with the second ferromagnetic layer to provide exchange bias magnetic field by exchange coupling at the interface of the layers. The magnetization direction in the second ferromagnetic layer is constrained or maintained by the exchange coupling, hereinafter the second layer is called "pinned layer". On the other hand the magnetization direction of the first ferromagnetic layer is free to rotate in response to an externally applied magnetic field, hereinafter the first layer is called "free layer". The direction of the magnetization in the free layer changes between parallel and anti-parallel against the direction of the magnetization in the pinned layer, and hence the magneto-resistance greatly changes and GMR characteristics are obtained.

The output characteristic of the SVMR element depends upon the angular difference of magnetization between the free and pinned ferromagnetic layers. The direction of the magnetization of the free layer is free to rotate in accordance with an external magnetic field. That of the pinned layer is fixed to a specific direction (called as "pinned direction") by the exchange coupling between this layer and adjacently formed anti-ferromagnetic layer.

In order to provide the exchange coupling between the pinned and anti-ferromagnetic layers, a process of temperature annealing under an external magnetic field with a specific direction (pin annealing or pin anneal process) is implemented. The pin annealing is done by elevating the temperature up to the Neel point at which magnetic regulation in the anti-ferromagnetic layer will be lost, and thereafter cooling down under application of magnetic field toward a desired magnetization direction.

In this kind of SVMR element, the direction of the magnetization in the pinned layer may change in some cases by various reasons. If the direction of the magnetization changes, the angular difference between the pinned and free layers changes too and therefore the output characteristic also changes. Consequently, controlling the direction of the magnetization in the pinned layer to a correct direction is very important.

However, the various characteristics of the SVMR element may be changed under actual high temperature operation of a HDD unit, even if the pin anneal processing is properly implemented. This change is caused by magnetic anisotropy change in the free layer due to the high temperature stress during operation of the HDD unit and due to the magnetic field by a hard magnet layer used for giving a bias magnetic field to the free layer.

The detail of this phenomenon is as follows.

(1) During fabricating process of the SVMR element, the free layer is deposited under application of magnetic field toward the track width direction. Thus, axis of easy magnetization of the free layer orients to the track width direction.

(2) The pin anneal process is done under application of magnetic field toward the pinned direction which is perpendicular to the easy magnetization axis of the free layer. Thus, the magnetic anisotropy of the free layer after the pin annealing may be weakened in comparison with that just after the deposition of the free layer, or the easy magnetization axis and the hard magnetization axis of the free layer may be reversed with each other.

(3) When the magnetic head with such a SVMR element is used under the state of high temperature, the magnetic anisotropy of the free layer changes again in accordance with magnetic field toward the track width direction from the hard magnet so that the axis of easy magnetization of the free layer gradually orients the track width direction.

(4) When actually using the magnetic head, magnetic field from the magnetic disk will be applied to the free layer in the direction perpendicular to the track width direction. Therefore, the change of the easy magnetization axis of the free layer toward the track width direction as described in (3) results that any magnetization change in the free layer becomes difficult and that the reproduction output from the magnetic head lowers or deteriorates.

Thus, the magnetic anisotropy of the free layer immediately after the pin anneal process changes as the magnetic head is actually used, and as a result degradation of the head reproduction output and degradation of the symmetry of output wave may arise.

In order to reduce degradation which may be occurred at the time of such actual use, a performing of a free layer annealing wherein the SVMR element is additionally heated under application of magnetic field toward the track width direction so as to strongly fix the easy magnetization axis of the free layer in the track width direction has been proposed in Japanese patent unexamined publication No.10-223942.

However, if such the free layer annealing is performed, the pinned direction of the pinned layer may change due to the heat treatment under application of the magnetic field toward the track width direction and lowering of the head reproduction output may be brought as a result.

The detail of this degradation phenomenon is as follows.

(a) The pinned direction of the magnetization in the pinned layer is different from that of the magnetic domain control field that is generated by the hard magnet (track width direction). And hence the direction of the magnetization of the pinned layer which is contacted with the anti-ferromagnetic layer is slightly rotated toward the direction of the magnetic domain control field (hereinafter the direction of the magnetization of the pinned layer is expressed as θp).

(b) In the anti-ferromagnetic material layer, the Neel point temperature differs from location to location inside the layer from macroscopic point of view, and it is distributed in a certain range of temperature. Even if the temperature is less than the "bulk" Neel point (average Neel point), there could be small area whose micro Neel point temperature is low and where the exchange coupling with the pinned layer disappears.

(c) When such SVMR element is operated at a high temperature T, which is equal to or less than the blocking temperature at which the exchange couplings of all microscopic areas disappear, and then cooled down to usual room temperature, some microscopic area whose Neel temperatures are less than T is effectively annealed again and the direction of the magnetization is rotated to θp.

(d) The total amount of the θp rotated area by the temperature cycle determines the magnetic structure of the anti-ferromagnetic layer and also the new direction of the magnetization of the pinned layer.

As stated in the above paragraph, performing of the free layer annealing may cause a change of the pinned direction in the pinned layer, and the electrical output characteristics of the SVMR element are degraded in signal levels, and waveform symmetry.

Hereinafter, the degradation of the output characteristics of the SVMR element due to the rotation of the pinned direction will be described with reference to drawings.

The SVMR element operates by detecting change in its electrical resistance depending upon an angle between directions of magnetization in the pinned and free layers as aforementioned. The electrical resistance R is expressed by $R=(1-\cos\theta)/2+\alpha$, where θ is the angle between directions of magnetization in the pinned and free layers and α is an electrical resistance (Rs) when the magnetization directions in the pinned and free layers are in parallel (θ=0 degree) as illustrated in FIG. 1a. When the magnetization directions in the pinned and free layers are in anti-parallel (θ=180 degrees) as illustrated in FIG. 1b, the electrical resistance becomes $R=1+\alpha$. Also, when the magnetization directions in the pinned and free layers are orthogonal (θ=90 degrees) as illustrated in FIG. 1c, the electrical resistance becomes $R=1/2+\alpha$.

As illustrated in FIG. 2, the SVMR element produces output voltage in response to the change in magnetization direction of the free layer caused by application of changing leakage magnetic field from the magnetic recording medium. Suppose that the direction of magnetization in the free layer rotates by +20 degrees (first magnetization state of the free layer) and by -20 degrees (second magnetization state of the free layer) due to the leakage magnetic field from the magnetic recording medium. If the pinned direction is normal, the resistance value across the SVMR element at the first magnetization state $R_{F1}$ is $R_{F1}=(1-\cos 70°)/2=0.329$ and the resistance value across the SVMR element at the second magnetization state $R_{F2}$ is $R_{F2}=(1-\cos 110°)/2=0.671$ as shown in FIG. 3a. Thus, the difference ΔR becomes as $\Delta R=R_{F2}-R_{F1}=0.342$. Whereas, if the pinned direction rotates by 20 degrees from the normal direction, the resistance value across the SVMR element at the first magnetization state $R_{F1}$ is $R_{F1}=(1-\cos 50°)/2=0.178$ and the resistance value across the SVMR element at the second magnetization state $R_{F2}$ is $R_{F2}=(1-\cos 90°)/2=0.500$ as shown in FIG. 3b. Thus, the difference ΔR becomes as $\Delta R=R_{F2}-R_{F1}=0.322$. Therefore, 20 degrees rotation of the pinned direction results degradation of 5.8% in the SVMR element output.

It will be understood from the above-description that output degradation of a SVMR element contains both degradation with time due to the applied heat and magnetic field during the actual use and first stage degradation due to change in the pinned direction caused by the free layer annealing. However, no manufacturing of a thin-film magnetic head had been performed so as to reduce the both degradations. For this reason, it was quite difficult to totally reduce output degradation.

SUMMARY OF THE INVENTION

It is therefore an object of the present invention to provide a manufacturing method of a thin-film magnetic head, whereby degradation of output of a SVMR element can be reduced certainly.

The present invention relates to a method of manufacturing a thin-film magnetic head with a SVMR element which includes first and second layers of a ferromagnetic material (free and pinned layers) separated by a layer of non-magnetic electrically conductive material, and a layer of anti-ferromagnetic material formed in physical contact with the second ferromagnetic material layer. According to the present invention, the method has a first temperature annealing (pin annealing) step of annealing the SVMR element under application of magnetic field to provide exchange coupling between the second ferromagnetic material layer and the anti-ferromagnetic material layer so that the second ferromagnetic material layer is pinned toward a predetermined direction, and a second temperature annealing (free layer annealing) step of annealing the SVMR element so that axis of easy magnetization of the first ferromagnetic material layer orients a direction substantially perpendicular to the predetermined direction. The free layer annealing is performed at a temperature lower than 150° C.

If annealing temperature in the free layer annealing is made high, although the degradation with lapse of time due to heat and magnetic field during the actual usage of the SVMR element can be reduced, the first stage degradation due to the rotation of the pinned direction in the pinned layer will increase conversely. However, it is enabled to reduce certainly the total degradation which is the sum of the first stage degradation and the degradation with lapse of time if the free layer annealing is performed at a temperature lower than 150° C. as the present invention. Consequently, the large enhancement of a yield can be expected.

It is preferred that the free layer annealing is performed at a temperature equal to or higher than 100° C.

It is also preferred that the free layer annealing is performed under application of magnetic field in a direction substantially perpendicular to the predetermined direction. In this case, it is more preferred that the free layer annealing be performed under application of external magnetic field of 500 Oe or less.

The free layer annealing is preferably performed just after the pin annealing, or at the same time as the pin annealing.

It is preferred that the method further has a step of forming of bias providing means for applying magnetic domain control field to the free layer, and that the free layer annealing is performed under no application of external magnetic field after forming the bias providing means.

The free layer annealing is preferably performed just after the pin annealing.

It is also preferred that the free layer annealing is performed for 1–10 hours.

Further objects and advantages of the present invention will be apparent from the following description of the preferred embodiments of the invention as illustrated in the accompanying drawings.

DESCRIPTION OF THE PREFERRED EMBODIMENTS

First Embodiment

Figure 4:
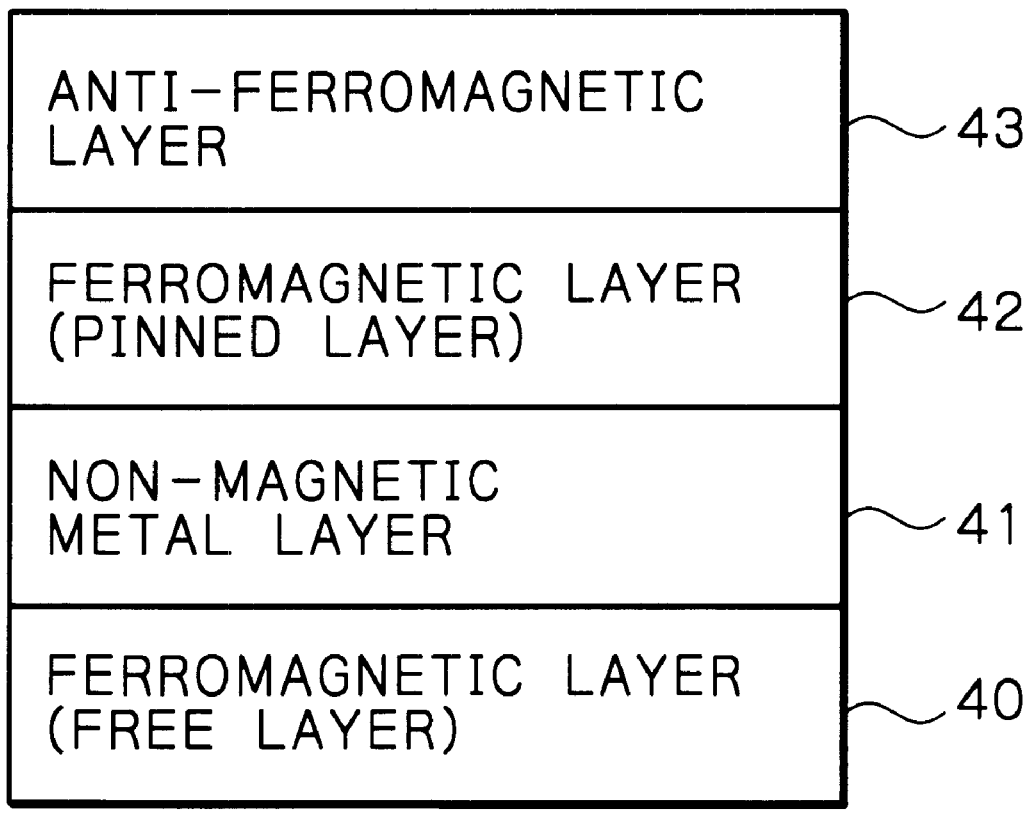
FIG. 4 is a cross-sectional view illustrating a fundamental structure of a SVMR element.

FIG. 4 illustrates a fundamental multi-layered structure of the SVMR element fabricated in the first embodiment according to the present invention. Referring to FIG. 4, reference number 40 and 42 are two ferromagnetic thin-film layers (free layer and pinned layer) which are magnetically separated by a thin-film layer 41 of a non-magnetic electrically conductive metallic material. On the pinned layer 42, a thin-film layer 43 of anti-ferromagnetic material is stacked, and a magnetic field generated by the exchange coupling at the interface of the pinned layer 42 and the anti-ferromagnetic layer 43 magnetizes the pinned layer 42, and so to speak this layer 42 is pinned. To the free layer 40, there is no effect of exchange coupling, and hence the magnetization of this layer 40 is free to rotate in response to a leakage magnetic field externally applied from a magnetic recording medium.

The manufacturing processes of the SVMR element and other structure of the magnetic head in this embodiment are quite common in the industry except for the pin anneal process and the free layer anneal process during the wafer fabrication. Therefore, only a pin anneal process and a free layer anneal process are described in detail hereinafter.

Figure 5:
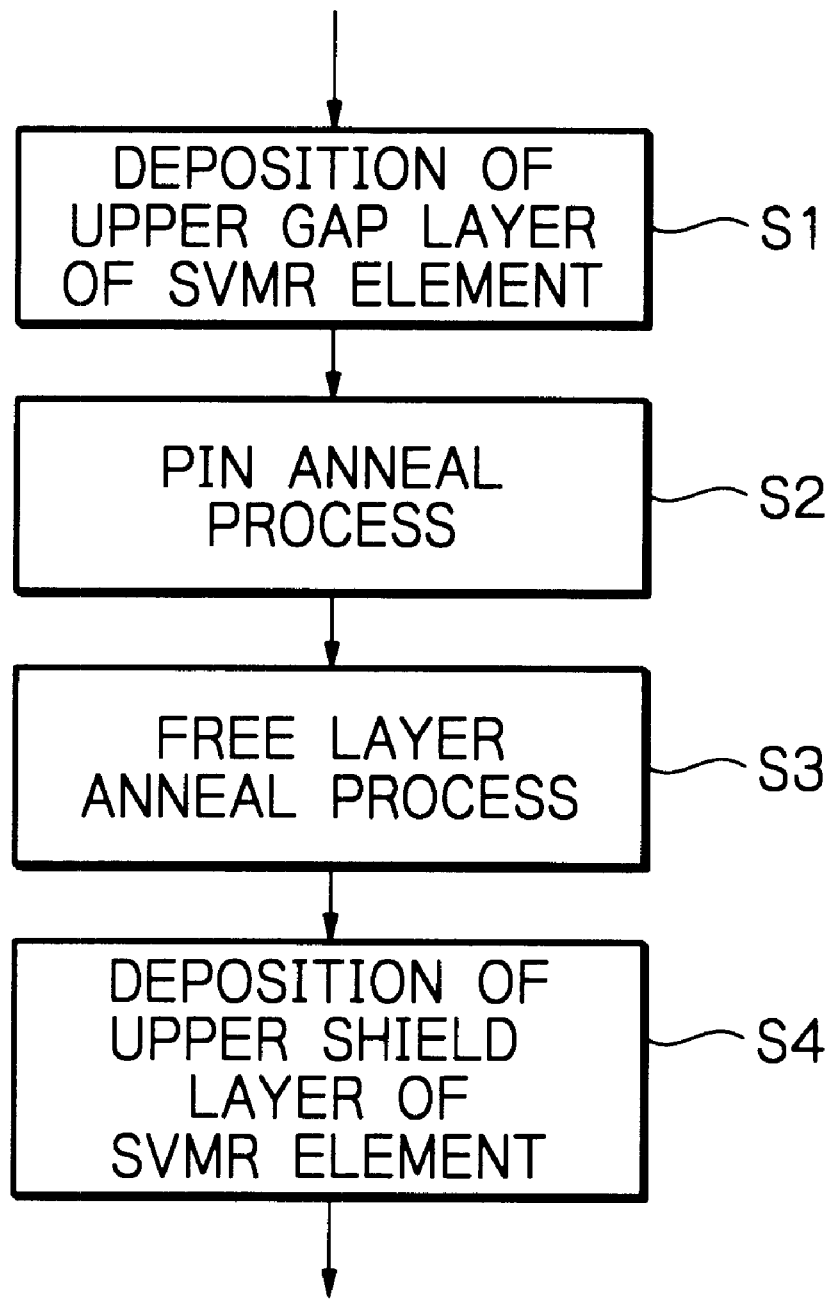
FIG. 5 is a flow chart illustrating orders of a pin anneal process and a free layer anneal process among manufacturing processes in first to fourth embodiments according to the present invention.

FIG. 5 illustrates orders of the pin anneal process and the free layer anneal process among manufacturing processes in the first embodiment according to the present invention.

The embodiment shown in the figure relates to manufacturing processes of the composite type thin-film magnetic heads each of which consists of the SVMR element with the anti-ferromagnetic layer 43 made of RuRhMn and an inductive write element. Generally, at the wafer fabrication process of such composite type thin-film magnetic heads, firstly many SVMR elements are built on a wafer, secondly inductive write elements are formed on the SVMR elements. In this first embodiment, the SVMR elements each having a first multi-layered structure of Ta(5 nm)/NiFe(8 nm)/Co(1 nm)/Cu(2.7 nm)/Co(4 nm)/RuRhMn(11 nm)/Ta(5 nm) are formed, and then the pin anneal process and the free layer anneal process are performed before formation of the inductive write elements.

As shown in FIG. 5, an upper gap layer is deposited on the formed SVMR elements on the wafer (step S1). Then, the pin anneal process is performed (step S2). In the pin anneal process, the wafer is heated at a temperature of about 260° C. and sustained it for almost 2 hours, under application of magnetic field of about 3 kOe toward the pinned direction which is perpendicular to the track width direction. Then, the heat treatment temperature is decreased, under the application of the magnetic field. During this temperature decreasing period, since the temperature lowers less than the blocking temperature of the anti-ferromagnetic material under application of the magnetic field toward pinning direction, exchange couplings between the pinned layer of ferromagnetic material 42 and the anti-ferromagnetic layer 43 are generated. The exchange coupling bias magnetic field $H_{EX}$ obtained in this first embodiment is $H_{EX}$=262 Oe.

Then, the free layer anneal process is performed (step S3). In this free layer anneal process, the wafer is heated at a temperature of about 145° C., sustained it for almost 5 hours and then decreased, under application of magnetic field of about 200 Oe toward the track width direction, namely toward the direction of bias magnetic field from the permanent magnet for controlling the magnetic domain of the free layer.

Thereafter, an upper shield layer is deposited on the SVMR elements (step S4), and then the inductive elements are formed on the upper shield layer. The following manufacturing processes are the same as these of the conventional manufacturing method.

Figure 1C:
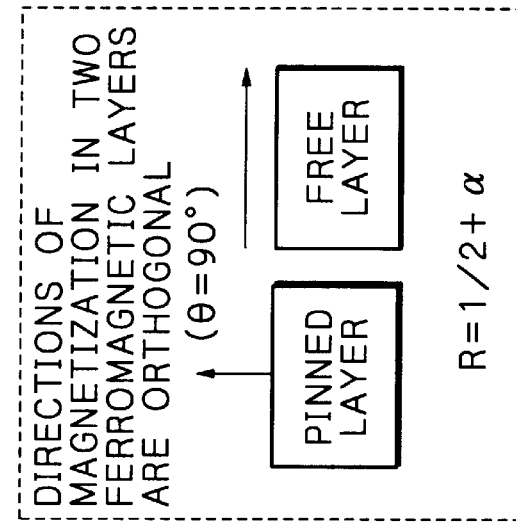
FIGS. 1a to 1c illustrate the principal of the spin valve effect.
Figure 1B:
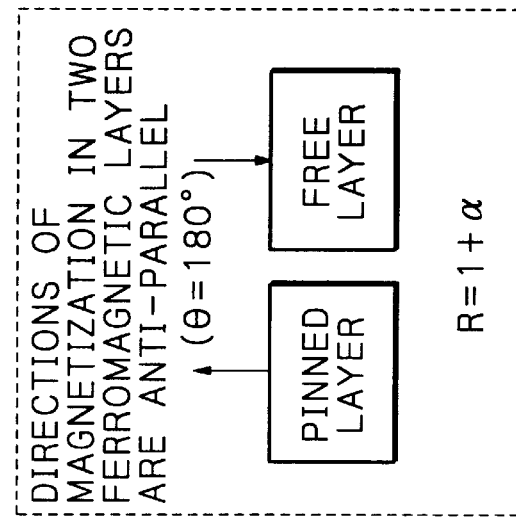
Figure 1A:
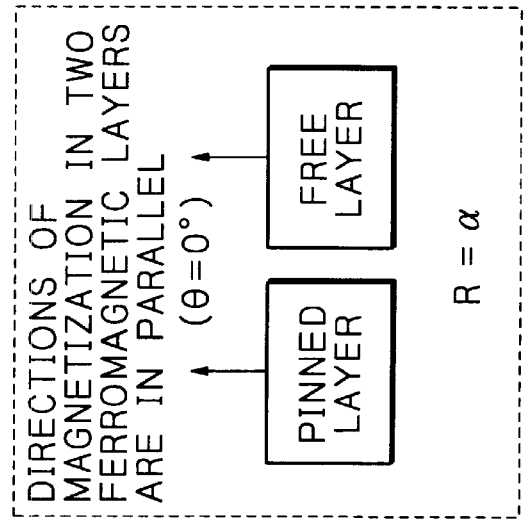
Figure 2:
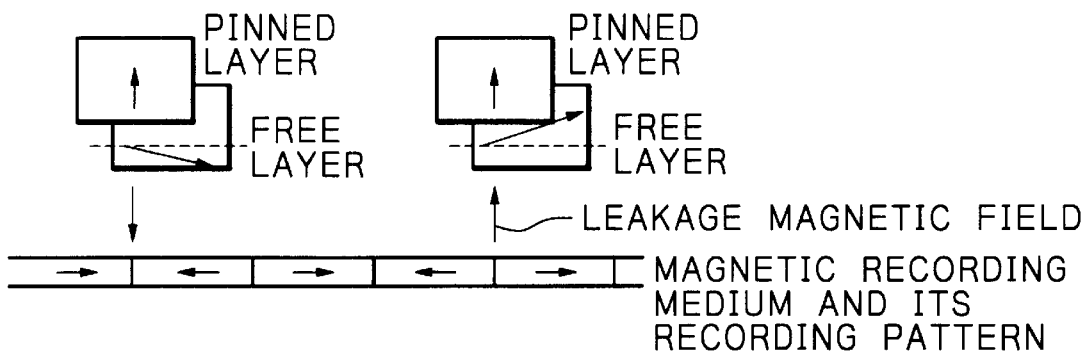
FIG. 2 illustrates operations of a SVMR element.
Figure 3A:
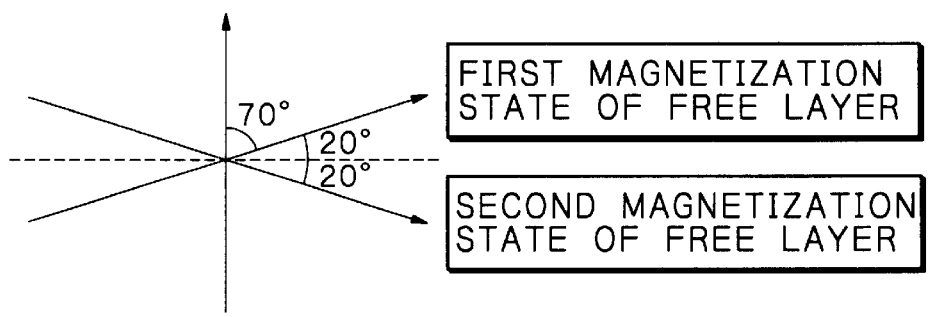
FIGS. 3a and 3b illustrates degradation of output characteristics of the SVMR element when its pinned direction rotates.
Figure 3B:
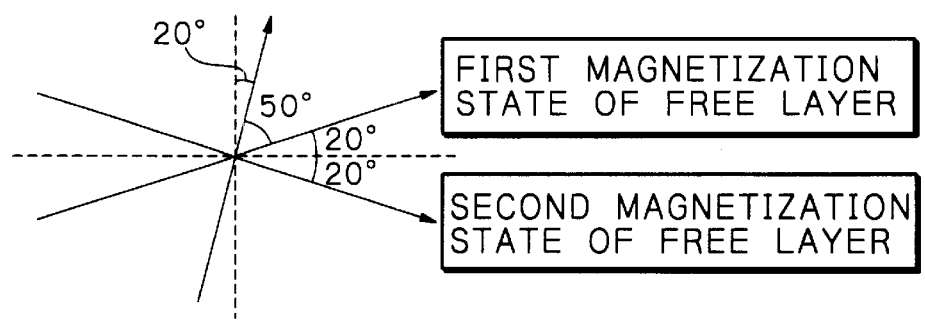

The rotated angle of the pinned direction caused by the free layer annealing according to this embodiment was 12 degrees. The output degradation of the SVMR element due to this pinned direction rotation (first stage degradation), which could be calculated by using the method described with reference to FIGS. 3a and 3b, was 2.2%.

On the other hand, the heat-resistant test for leaving the SVMR element at the temperature of 150° C. was performed in order to know the degradation with lapse of time when the SVMR element after the free layer annealing of this embodiment would be actually used under the application of heat and magnetic field. The result is shown in Table 1 and FIG. 6 (145° C.—200 Oe). The numeric values in Table 1 indicate the ratio of output degradation (%).

It will be noted from this heat-resistant test that the output degradation of the SVMR element left at 150° C. for 1000 hours (degradation with lapse of time) was 2.3%. Therefore, the ratio of a total degradation which is the sum of the output degradation ratio with lapse of time and the first stage degradation ratio of the SVMR element became 4.5%.

TABLE 1

| Ta (5 nm)/NiFe (8 nm)/Co (1 nm)/Cu (2.7 nm)/ Co (4 nm)/RuRhMn (11 nm)/Ta (5 nm) | | | | | | | |
|---|---|---|---|---|---|---|---|
| Free Layer Annealing | Initial | Left for 5 hours | Left for 12 hours | Left for 24 hours | Left for 100 hours | Left for 500 hours | Left for 1000 hours |
| No Annealing | 0 | −7.1 | −8.4 | −9.2 | −9.6 | −10.4 | −13.0 |
| 170° C. 200 Oe | 0 | −1.0 | −1.0 | −0.9 | −1.0 | −1.1 | −1.3 |
| 145° C. 200 Oe | 0 | −1.5 | −1.7 | −2.0 | −2.0 | −2.2 | −2.3 |
| 125° C. 200 Oe | 0 | −3.4 | −3.7 | −4.0 | −4.2 | −4.5 | −4.6 |

As a modification of this embodiment, a SVMR element with the same first multi-layered structure but only the conditions of the free layer annealing are changed is explained hereinafter.

In this free layer anneal process, the wafer is heated at a temperature of about 125° C., sustained it for almost 10 hours and then decreased, under application of magnetic field of about 200 Oe toward the track width direction, namely toward the direction of bias magnetic field from the permanent magnet for controlling the magnetic domain of the free layer.

The rotated angle of the pinned direction caused by the free layer annealing according to this modification was 5 degrees. The output degradation of the SVMR element due to this pinned direction rotation (first stage degradation) was 0.3%. As will be noted from Table 1 and FIG. 6 (125° C.—200 Oe), the heat-resistant test resulted that the output degradation of the SVMR element left at 150° C. for 1000 hours (degradation with lapse of time) was 4.6%. Therefore, the ratio of a total degradation which is the sum of the output degradation ratio with lapse of time and the first stage degradation ratio of the SVMR element became 4.9%.

As a first comparison example against this embodiment, a SVMR element with the same first multi-layered structure but only the conditions of the free layer annealing are changed is explained hereinafter.

In this free layer anneal process, the wafer is heated at a temperature of about 170° C., sustained it for almost 2 hours and then decreased, under application of magnetic field of about 200 Oe toward the track width direction, namely toward the direction of bias magnetic field from the permanent magnet for controlling the magnetic domain of the free layer.

The rotated angle of the pinned direction caused by the free layer annealing according to this comparison example was 20 degrees. The output degradation of the SVMR element due to this pinned direction rotation (first stage degradation) was 6.0%. As will be noted from Table 1 and FIG. 6 (170° C.—200 Oe), the heat-resistant test resulted that the output degradation of the SVMR element left at 150° C. for 1000 hours (degradation with lapse of time) was 1.3%. Therefore, the ratio of a total degradation which is the sum of the output degradation ratio with lapse of time and the first stage degradation ratio of the SVMR element became 7.3%.

As a second comparison example against this embodiment, a SVMR element with the same first multi-layered structure but no free layer annealing is performed is explained hereinafter.

The rotated angle of the pinned direction according to this comparison example was 0 degrees. The output degradation of the SVMR element due to this pinned direction rotation (first stage degradation) was as a natural matter 0.0%. As will be noted from Table 1 and FIG. 6 (no free layer annealing), the heat-resistant test resulted that the output degradation of the SVMR element left at 150° C. for 1000 hours (degradation with lapse of time) was 13.0%. Therefore, the ratio of a total degradation which is the sum of the output degradation ratio with lapse of time and the first stage degradation ratio of the SVMR element became 13.0%.

Figure 6:
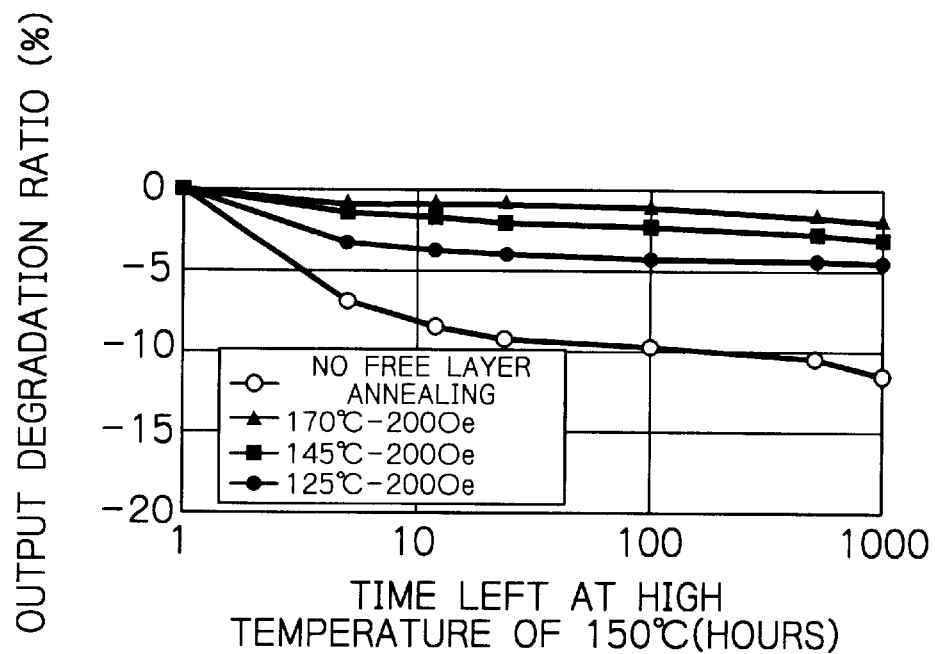
FIG. 6 is a graph illustrating a result of heat-resistant test of a SVMR element with a first multi-layered structure according to the first embodiment.

As aforementioned, Table 1 and FIG. 6 indicate the result of the heat-resistant test of the first embodiment, its modification, the first comparison example and the second comparison example which have the same first multi-layered structure. Also, Table 7 which will be described later indicates the first stage degradation ratio, the degradation ratio with lapse of time and the total degradation ratio of the SVMR element output.

Figure 7:
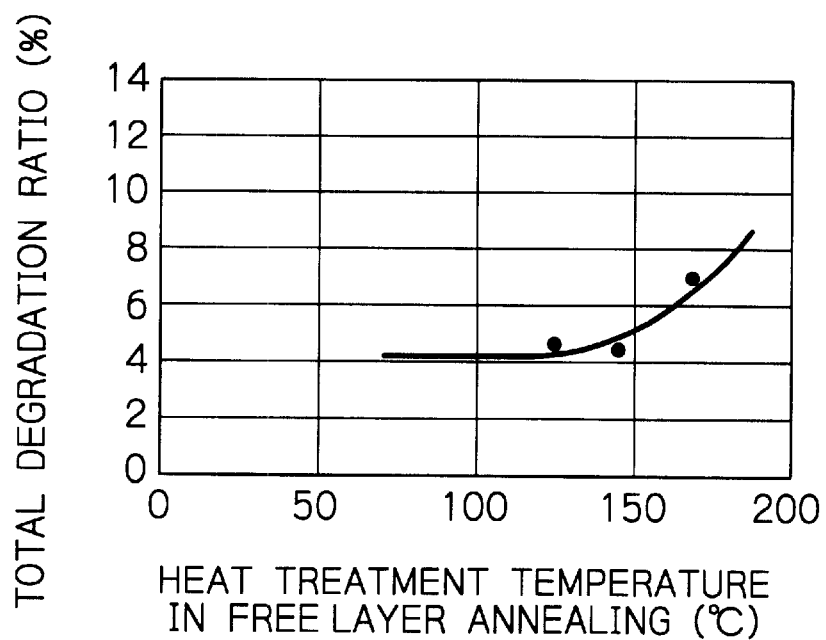
FIG. 7 is a graph illustrating a relationship between treatment temperature in the free layer annealing and total degradation ratio of the SVMR element with the first multi-layered structure according to the first embodiment.

FIG. 7 illustrates a relationship between treatment temperature in the free layer annealing and total degradation ratio of the above-mentioned SVMR elements with the first multi-layered structure.

As will be apparent from this figure, the total degradation ratio of the SVMR element output will be reduced if the treatment temperature of the free layer annealing becomes less than 150° C. However, in order to perform an effective free layer annealing, it is required to make the treatment temperature of the free layer annealing at 100° C. or more. Therefore, it is a key point that the free layer annealing should be performed at the treatment temperature of 100° C. or more but less than 150° C.

When the SVMR element is actually used, the pinned direction will incline toward the direction of the bias magnetic field provided from the hard magnet for controlling the magnetic domain due to heating of the environment under the applied bias magnetic field from the hard magnet. Thus, if the change of the pinned direction caused by the free layer annealing is the same direction as that of the bias magnetic field, the rotation of the pinned direction will more increase. For this reason, it is preferred that the change of the pinned direction caused by the free layer annealing is anti-parallel direction with respect to the direction of the bias magnetic field from the hard magnet. The latter case is desirable because the pinned direction will change toward the direction that is perpendicular to the magnetization direction of the free layer when the SVMR element is actually used. However, too much leaning may provide the opposite effect.

According to experiments of the inventors of this application, it has been confirmed that the rotation of the pinned direction due to actual usage of the SVMR element is about 5–15 degrees. Therefore, the rotation angle caused by the free layer annealing will not exceed over 5–15 degrees if it is set that the pinned direction caused by the free layer annealing will change toward anti-parallel direction with respect to the direction of the bias magnetic field from the hard magnet. Of course, it is desired that the rotated angle is small as much as possible.

Figure 8A:
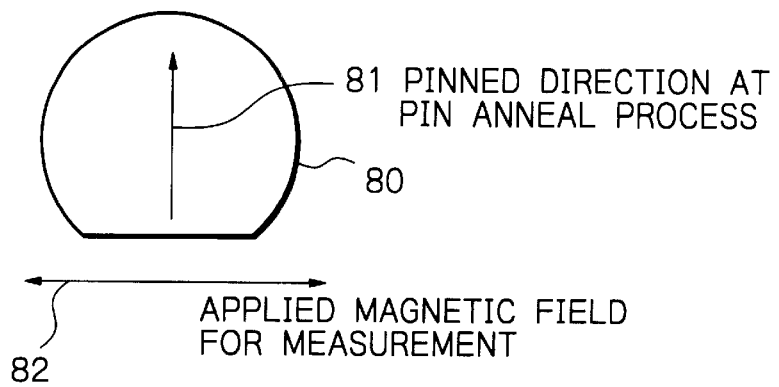
FIGS. 8a to 8c illustrate how to detect the rotated angle of the pinned direction.
Figure 8B:
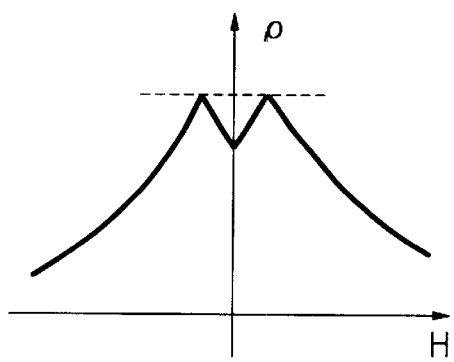
Figure 8C:
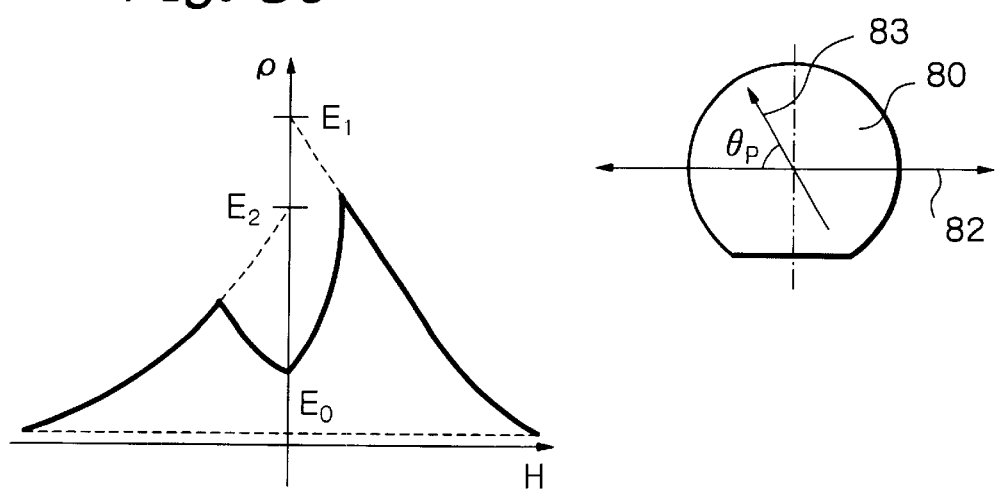

The rotation angle of the pinned direction can be easily calculated from the output level of the SVMR element. Namely, as shown in FIG. 8a, first a magnetic field 82, which is perpendicular to the direction of the applied magnetic field 81, namely the pinned direction, is applied to the wafer 80, then ρ-H loop is measured. If there is no rotation of the pinned direction, the measured ρ-H loop is horizontally symmetrical as shown in FIG. 8b. If there is definite rotation of the pinned direction, the measured ρ-H loop becomes horizontally unsymmetrical as shown in FIG. 8c. Assuming θp as the angle difference between the rotated pinned direction 83 and the applied measurement field direction 82, the following equation is formulated, $(E_1-E_0)/(E_2-E_0)=\{(1-\cos\theta p)/2\}/\{(1+\cos\theta p)/2\}$. Consequently θp is given by the next equation, $\theta p=\cos^{-1}\{(E_1-E_0)/(E_2-E_1+2E_0)\}$. The rotation angle of the pinned direction is given by 90°−θp.

In the aforementioned first embodiment, the free layer annealing is carried out after the pin annealing. However, both the free layer annealing and the pin annealing can be carried out in the same process.

Second Embodiment

As for a second embodiment according to the present invention, manufacturing processes of the composite type thin-film magnetic heads each of which consists of the SVMR element with the anti-ferromagnetic layer 43 made of RuRhMn and an inductive write element are described hereinafter. In this second embodiment, the SVMR elements each having a second multi-layered structure of Ta(5 nm)/NiFe(8 nm)/Co(1 nm)/Cu(2.7 nm)/Co(4 nm)/RuRhMn(15 nm)/Ta(5 nm) are formed, and then the pin anneal process and the free layer anneal process are performed before formation of the inductive write elements.

The manufacturing processes in this second embodiment are the same as those of the first embodiment except for the free layer anneal process. The exchange coupling bias magnetic field $H_{EX}$ obtained in this second embodiment is $H_{EX}$=194 Oe. Hereinafter, only the free layer anneal process is described in detail.

In the free layer anneal process of this second embodiment, the wafer is heated at a temperature of about 145° C., sustained it for almost 4 hours and then decreased, under application of magnetic field of about 100 Oe toward the track width direction, namely toward the direction of bias magnetic field from the permanent magnet for controlling the magnetic domain of the free layer.

The rotated angle of the pinned direction caused by the free layer annealing according to this embodiment was 13 degrees. The output degradation of the SVMR element due to this pinned direction rotation (first stage degradation) was 2.6%.

The heat-resistant test for leaving the SVMR element at the temperature of 150° C. was performed in order to know the degradation with lapse of time when the SVMR element after the free layer annealing of this embodiment would be actually used under the application of heat and magnetic field. The result is shown in Table 2 and FIG. 9 (145° C.—100 Oe). The numeric values in Table 2 indicate the ratio of output degradation (%).

It will be noted from this heat-resistant test that the output degradation of the SVMR element left at 150° C. for 1000 hours (degradation with lapse of time) was 4.0%. Therefore, the ratio of a total degradation which is the sum of the output degradation ratio with lapse of time and the first stage degradation ratio of the SVMR element became 6.6%.

TABLE 2

Ta (5 nm)/NiFe (8 nm)/Co (1 nm)/Cu (2.7 nm)/
Co (4 nm)/RuRhMn (15 nm)/Ta (5 nm)

| Free Layer Annealing | Initial | Left for 5 hours | Left for 12 hours | Left for 24 hours | Left for 100 hours | Left for 500 hours | Left for 1000 hours |
|---|---|---|---|---|---|---|---|
| No Annealing | 0 | −6.2 | −7.6 | −8.9 | −10.6 | −11.8 | −12.0 |
| 200° C. 100 Oe | 0 | −0.9 | −1.1 | −1.2 | −1.4 | −1.9 | −2.0 |
| 145° C. 100 Oe | 0 | −1.7 | −2.0 | −2.5 | −2.7 | −3.3 | −4.0 |
| 125° C. 100 Oe | 0 | −3.4 | −4.6 | −5.3 | −6.0 | −6.5 | −7.2 |

As a modification of this embodiment, a SVMR element with the same second multi-layered structure but only the conditions of the free layer annealing are changed is explained hereinafter.

In this free layer anneal process, the wafer is heated at a temperature of about 125° C., sustained it for almost 6 hours and then decreased, under application of magnetic field of about 100 Oe toward the track width direction, namely toward the direction of bias magnetic field from the permanent magnet for controlling the magnetic domain of the free layer.

The rotated angle of the pinned direction caused by the free layer annealing according to this modification was 6 degrees. The output degradation of the SVMR element due to this pinned direction rotation (first stage degradation) was 0.5%. As will be noted from Table 2 and FIG. 9 (125° C.—100 Oe), the heat-resistant test resulted that the output degradation of the SVMR element left at 150° C. for 1000 hours (degradation with lapse of time) was 7.2%. Therefore, the ratio of a total degradation which is the sum of the output degradation ratio with lapse of time and the first stage degradation ratio of the SVMR element became 7.7%.

As a first comparison example against this embodiment, a SVMR element with the same second multi-layered structure but only the conditions of the free layer annealing are changed is explained hereinafter.

In this free layer anneal process, the wafer is heated at a temperature of about 200° C., sustained it for almost 2 hours and then decreased, under application of magnetic field of about 100 Oe toward the track width direction, namely toward the direction of bias magnetic field from the permanent magnet for controlling the magnetic domain of the free layer.

The rotated angle of the pinned direction caused by the free layer annealing according to this comparison example was 22 degrees. The output degradation of the SVMR element due to this pinned direction rotation (first stage degradation) was 7.3%. As will be noted from Table 2 and FIG. 9 (200° C.—100 Oe), the heat-resistant test resulted that the output degradation of the SVMR element left at 150° C. for 1000 hours (degradation with lapse of time) was 2.0%. Therefore, the ratio of a total degradation which is the sum of the output degradation ratio with lapse of time and the first stage degradation ratio of the SVMR element became 9.3%.

As a second comparison example against this embodiment, a SVMR element with the same second multi-layered structure but no free layer annealing is performed is explained hereinafter.

The rotated angle of the pinned direction according to this comparison example was 0 degrees. The output degradation of the SVMR element due to this pinned direction rotation (first stage degradation) was as a natural matter 0.0%. As will be noted from Table 2 and FIG. 9 (no free layer annealing), the heat-resistant test resulted that the output degradation of the SVMR element left at 150° C. for 1000 hours (degradation with lapse of time) was 12.0%. Therefore, the ratio of a total degradation which is the sum of the output degradation ratio with lapse of time and the first stage degradation ratio of the SVMR element became 12.0%.

Figure 9:
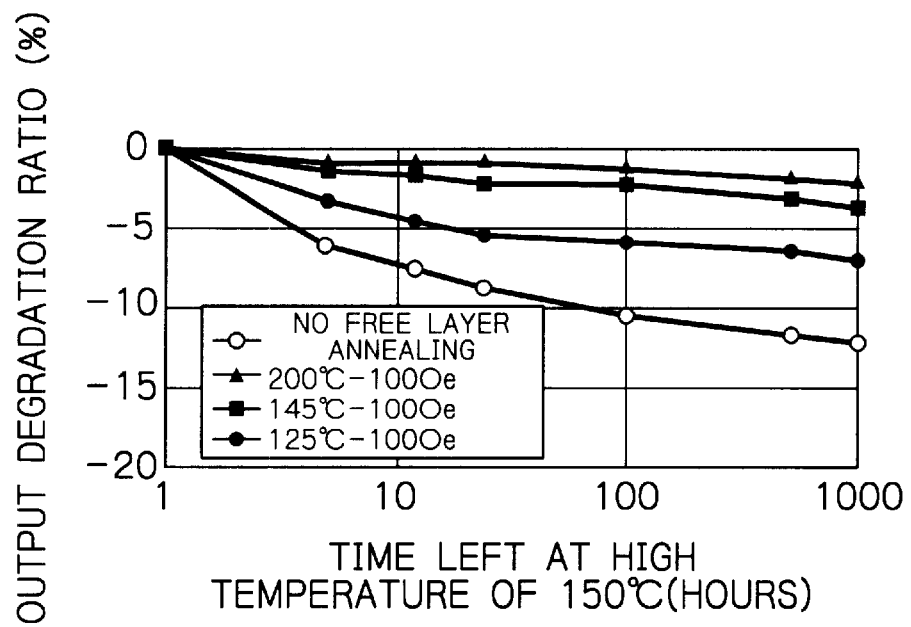
FIG. 9 is a graph illustrating a result of heat-resistant test of a SVMR element with a second multi-layered structure according to the second embodiment.

As aforementioned, Table 2 and FIG. 9 indicate the result of the heat-resistant test of the second embodiment, its modification, the first comparison example and the second comparison example which have the same second multi-layered structure. Also, Table 7 which will be described later indicates the first stage degradation ratio, the degradation ratio with lapse of time and the total degradation ratio of the SVMR element output.

Figure 10:
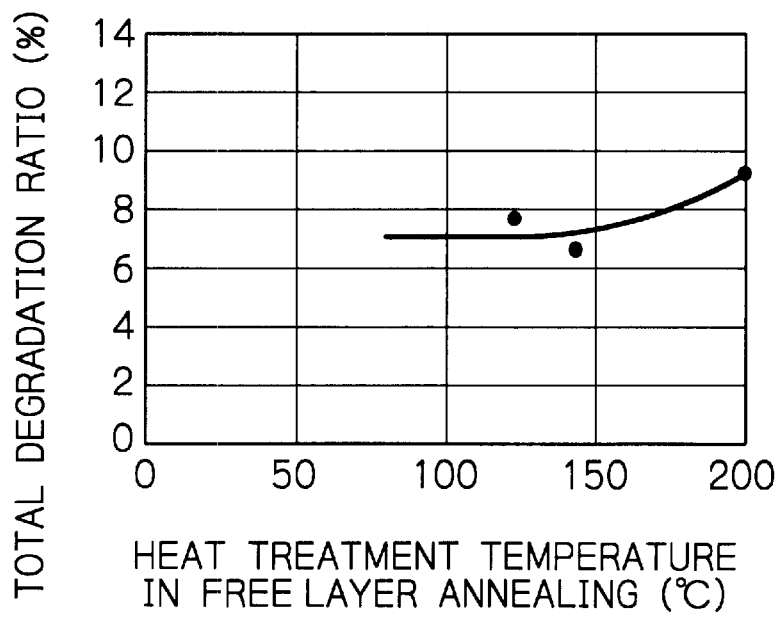
FIG. 10 is a graph illustrating a relationship between treatment temperature in the free layer annealing and total degradation ratio of the SVMR element with the second multi-layered structure according to the second embodiment.

FIG. 10 illustrates a relationship between treatment temperature in the free layer annealing and total degradation ratio of the above-mentioned SVMR elements with the second multi-layered structure.

As will be apparent from this figure, the total degradation ratio of the SVMR element output will be reduced if the treatment temperature of the free layer annealing becomes less than 150° C. However, in order to perform an effective free layer annealing, it is required to make the treatment temperature of the free layer annealing at 100° C. or more. Therefore, it is a key point that the free layer annealing should be performed at the treatment temperature of 100° C. or more but less than 150° C.

Another operations and advantages of this second embodiment are the same as those of the first embodiment.
Third Embodiment As for a third embodiment according to the present invention, manufacturing processes of the composite type thin-film magnetic heads each of which consists of the SVMR element with the anti-ferromagnetic layer 43 made of RuMn and an inductive write element are described hereinafter. In this third embodiment, the SVMR elements each having a third multi-layered structure of Ta(5 nm)/NiFe(8 nm)/Co(1 nm)/Cu(2.5 nm)/Co(4 nm)/RuMn(12 nm)/Ta(5 nm) are formed, and then the pin anneal process and the free layer anneal process are performed before formation of the inductive write elements.

The manufacturing processes in this third embodiment are the same as those of the first embodiment except for the free layer anneal process. The exchange coupling bias magnetic field $H_{EX}$ obtained in this third embodiment is $H_{EX}$=215 Oe. Hereinafter, only the free layer anneal process is described in detail.

In the free layer anneal process of this third embodiment, the wafer is heated at a temperature of about 145° C., sustained it for almost 6 hours and then decreased, under application of magnetic field of about 100 Oe toward the track width direction, namely toward the direction of bias magnetic field from the permanent magnet for controlling the magnetic domain of the free layer.

The rotated angle of the pinned direction caused by the free layer annealing according to this embodiment was 6 degrees. The output degradation of the SVMR element due to this pinned direction rotation (first stage degradation) was 0.5%.

The heat-resistant test for leaving the SVMR element at the temperature of 150° C. was performed in order to know the degradation with lapse of time when the SVMR element after the free layer annealing of this embodiment would be actually used under the application of heat and magnetic field. The result is shown in Table 3 and FIG. 11 (145° C.—100 Oe). The numberic values in Table 3 indicate the ratio of output degradation (%).

It will be noted from this heat-resistant test that the output degradation of the SVMR element left at 150° C. for 1000 hours (degradation with lapse of time) was 4.8%. Therefore, the ratio of a total degradation which is the sum of the output degradation ratio with lapse of time and the first stage degradation ratio of the SVMR element became 5.3%.

TABLE 3

Ta (5 nm)/NiFe (8 nm)/Co (1 nm)/Cu (2.5 nm)/
Co (4 nm)/RuMn (12 nm)/Ta (5 nm)

| Free Layer Annealing | Initial | Left for 5 hours | Left for 12 hours | Left for 24 hours | Left for 100 hours | Left for 500 hours | Left for 1000 hours |
|---|---|---|---|---|---|---|---|
| No Annealing | 0 | −8.4 | −10.3 | −11.8 | −14.2 | −15.7 | −17.4 |
| 160° C. 100 Oe | 0 | −1.8 | −2.1 | −2.7 | −3.1 | −3.6 | −3.8 |
| 145° C. 100 Oe | 0 | −2.8 | −3.2 | −3.5 | −4.3 | −4.5 | −4.8 |
| 125° C. 100 Oe | 0 | −3.4 | −4.4 | −5.3 | −6.0 | −6.0 | −6.2 |

As a modification of this embodiment, a SVMR element with the same third multi-layered structure but only the conditions of the free layer annealing are changed is explained hereinafter.

In this free layer anneal process, the wafer is heated at a temperature of about 125° C., sustained it for almost 8 hours and then decreased, under application of magnetic field of about 100 Oe toward the track width direction, namely toward the direction of bias magnetic field from the permanent magnet for controlling the magnetic domain of the free layer.

The rotated angle of the pinned direction caused by the free layer annealing according to this modification was 3 degrees. The output degradation of the SVMR element due to this pinned direction rotation (first stage degradation) was 0.1%. As will be noted from Table 3 and FIG. 11 (125° C.—100 Oe), the heat-resistant test resulted that the output degradation of the SVMR element left at 150° C. for 1000 hours (degradation with lapse of time) was 6.2%. Therefore, the ratio of a total degradation which is the sum of the output degradation ratio with lapse of time and the first stage degradation ratio of the SVMR element became 6.3%.

As a first comparison example against this embodiment, a SVMR element with the same third multi-layered structure but only the conditions of the free layer annealing are changed is explained hereinafter.

In this free layer anneal process, the wafer is heated at a temperature of about 160° C., sustained it for almost 3 hours and then decreased, under application of magnetic field of about 100 Oe toward the track width direction, namely toward the direction of bias magnetic field from the permanent magnet for controlling the magnetic domain of the free layer.

The rotated angle of the pinned direction caused by the free layer annealing according to this comparison example was 17 degrees. The output degradation of the SVMR element due to this pinned direction rotation (first stage degradation) was 4.5%. As will be noted from Table 3 and FIG. 11 (160° C.—100 Oe), the heat-resistant test resulted that the output degradation of the SVMR element left at 150° C. for 1000 hours (degradation with lapse of time) was 3.8%. Therefore, the ratio of a total degradation which is the sum of the output degradation ratio with lapse of time and the first stage degradation ratio of the SVMR element became 8.3%.

As a second comparison example against this embodiment, a SVMR element with the same third multi-layered structure but no free layer annealing is performed is explained hereinafter.

The rotated angle of the pinned direction according to this comparison example was 0 degrees. The output degradation of the SVMR element due to this pinned direction rotation (first stage degradation) was as a natural matter 0.0%. As will be noted from Table 3 and FIG. 11 (no free layer annealing), the heat-resistant test resulted that the output degradation of the SVMR element left at 150° C. for 1000 hours (degradation with lapse of time) was 17.4%. Therefore, the ratio of a total degradation which is the sum of the output degradation ratio with lapse of time and the first stage degradation ratio of the SVMR element became 17.4%.

Figure 11:
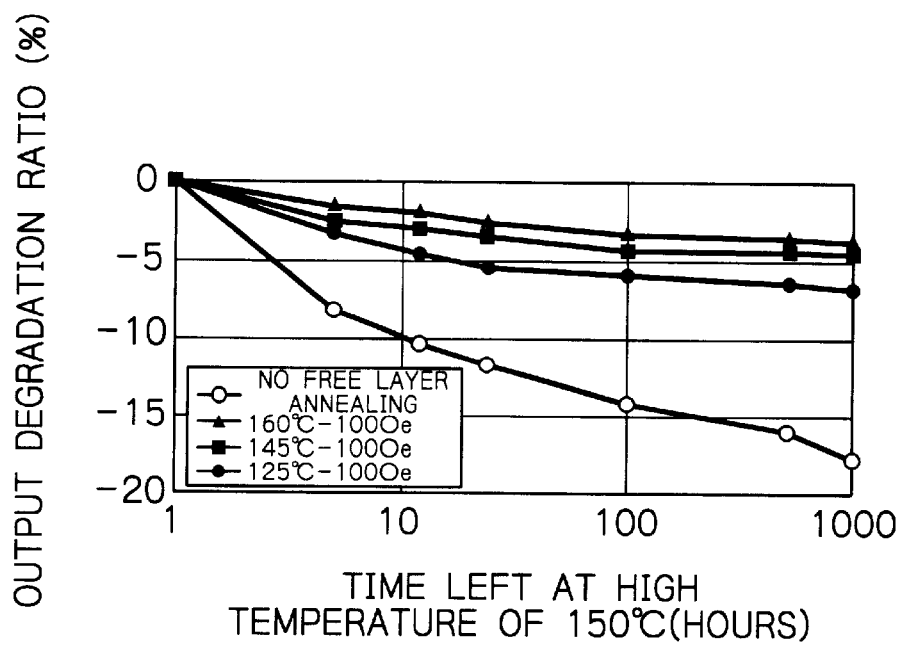
FIG. 11 is a graph illustrating a result of heat-resistant test of a SVMR element with a third multi-layered structure according to the third embodiment.

As aforementioned, Table 3 and FIG. 11 indicate the result of the heat-resistant test of the third embodiment, its modification, the first comparison example and the second comparison example which have the same third multi-layered structure. Also, Table 7 which will be described later indicates the first stage degradation ratio, the degradation ratio with lapse of time and the total degradation ratio of the SVMR element output.

Figure 12:
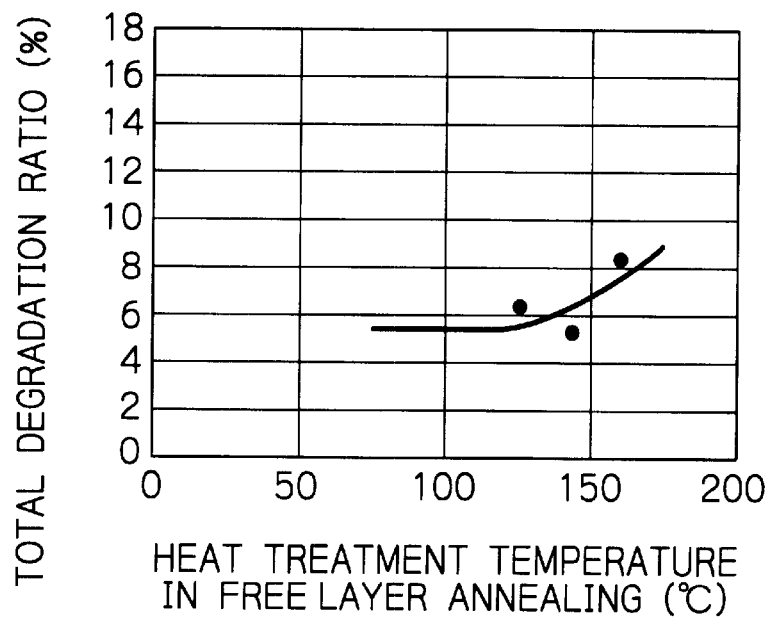
FIG. 12 is a graph illustrating a relationship between treatment temperature in the free layer annealing and total degradation ratio of the SVMR element with the third multi-layered structure according to the third embodiment.
Figure 13:
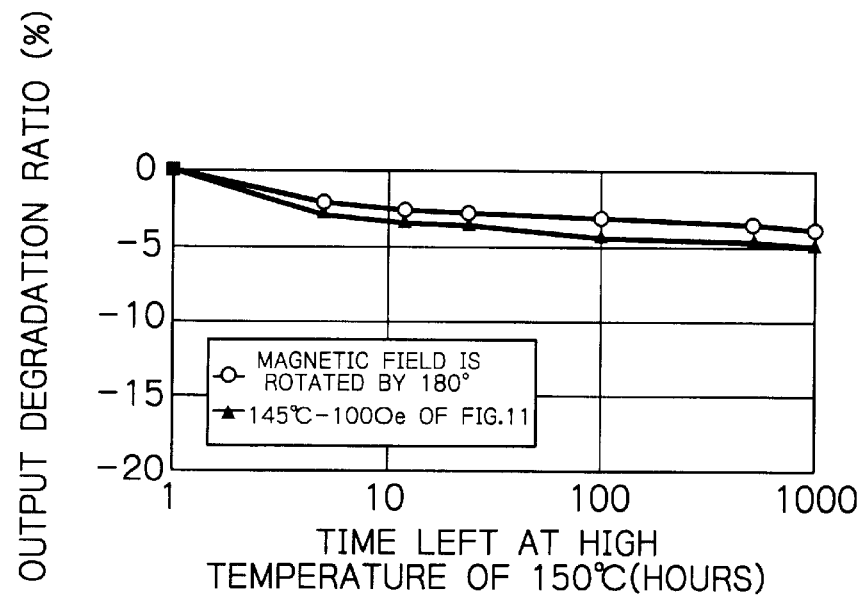
FIG. 13 is a graph illustrating a result of heat-resistant test of a SVMR element with the third multi-layered structure according to the fourth embodiment.

FIG. 12 illustrates a relationship between treatment temperature in the free layer annealing and total degradation ratio of the above-mentioned SVMR elements with the third multi-layered structure.

As will be apparent from this figure, the total degradation ratio of the SVMR element output will be reduced if the treatment temperature of the free layer annealing becomes less than 150° C. However, in order to perform an effective free layer annealing, it is required to make the treatment temperature of the free layer annealing at 100° C. or more. Therefore, it is a key point that the free layer annealing should be performed at the treatment temperature of 100° C. or more but less than 150° C.

Another operations and advantages of this third embodiment are the same as those of the first embodiment.

Fourth Embodiment

As for a fourth embodiment according to the present invention, manufacturing processes of the composite type thin-film magnetic heads each of which consists of the SVMR element with the anti-ferromagnetic layer 43 made of RuMn and an inductive write element are described hereinafter. In this fourth embodiment, the SVMR elements each having the same third multi-layered structure as that of the SVMR element in the third embodiment, and then the pin anneal process and the free layer anneal process are performed before formation of the inductive write elements.

The manufacturing processes in this fourth embodiment are the same as those of the third embodiment except for the free layer anneal process. The exchange coupling bias magnetic field $H_{EX}$ obtained in this fourth embodiment is $H_{EX}$=215 Oe. Hereinafter, only the free layer anneal process is described in detail.

In the free layer anneal process of this fourth embodiment, magnetic field oriented to the reversed direction as that of the magnetic field in the third embodiment is applied. Namely, the wafer is heated at a temperature of about 145° C., sustained it for almost 6 hours and then decreased, under application of the magnetic field of about 100 Oe toward the track width direction, namely toward opposite to the direction of bias magnetic field from the permanent magnet for controlling the magnetic domain of the free layer.

The rotated angle of the pinned direction caused by the free layer annealing according to this embodiment was −6 degrees. The output degradation of the SVMR element due to this pinned direction rotation (first stage degradation) was 0.5%.

The heat-resistant test for leaving the SVMR element at the temperature of 150° C. was performed in order to know the degradation with lapse of time when the SVMR element after the free layer annealing of this embodiment would be actually used under the application of heat and magnetic field. The result is shown in Table 4 and FIG. 14 (magnetic field is rotated by 180°). The numeric values in Table 4 indicate the ratio of output degradation (%).

It will be noted from this heat-resistant test that the output degradation of the SVMR element left at 150° C. for 1000 hours (degradation with lapse of time) was 3.6%. Therefore, the ratio of a total degradation which is the sum of the output degradation ratio with lapse of time and the first stage degradation ratio of the SVMR element became 4.1%.

TABLE 4

Ta (5 nm)/NiFe (8 nm)/Co (1 nm)/Cu (2.5 nm)/
Co (4 nm)/RuMn (12 nm)/Ta (5 nm)

| Free Layer Annealing | Initial | Left for 5 hours | Left for 12 hours | Left for 24 hours | Left for 100 hours | Left for 500 hours | Left for 1000 hours |
|---|---|---|---|---|---|---|---|
| Magnetic Field is Rotated by 180° | 0 | −2.1 | −2.5 | −2.7 | −2.9 | −3.2 | −3.6 |
| 145° C. 100 Oe (Table 3) | 0 | −2.8 | −3.2 | −3.5 | −4.3 | −4.5 | −4.8 |

Another operations and advantages of this fourth embodiment are the same as those of the third embodiment.

Fifth Embodiment

The manufacturing processes of the SVMR element and other structure of the magnetic head in this embodiment are quite common in the industry except for the pin anneal process and the free layer anneal process during the wafer fabrication. Therefore, only a pin anneal process and a free layer anneal process are described in detail hereinafter.

Figure 14:
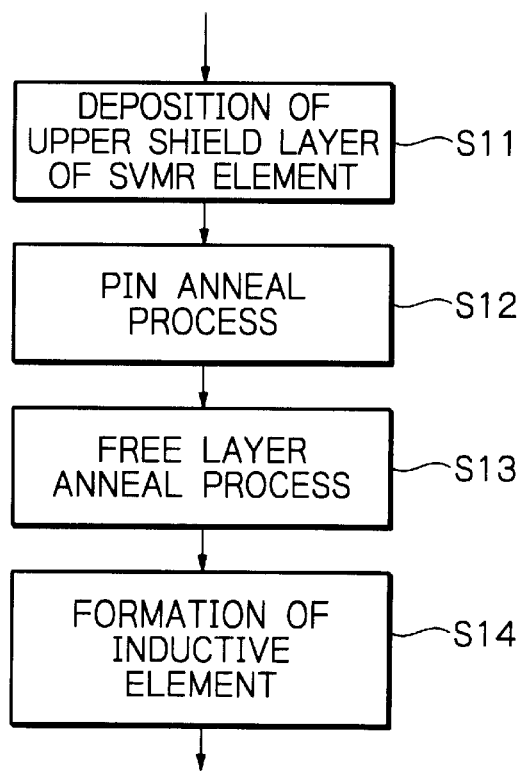
FIG. 14 is a flow chart illustrating orders of a pin anneal process and a free layer anneal process among manufacturing processes in fifth and sixth embodiments according to the present invention.

FIG. 14 illustrates orders of the pin anneal process and the free layer anneal process among manufacturing processes in the fifth embodiment according to the present invention.

The embodiment shown in the figure relates to manufacturing processes of the composite type thin-film magnetic heads each of which consists of the SVMR element with the anti-ferromagnetic layer 43 made of PtMn and an inductive write element. Generally, at the wafer fabrication process of such composite type thin-film magnetic heads, firstly many SVMR elements are built on a wafer, secondly inductive write elements are formed on the SVMR elements. In this fifth embodiment, the SVMR elements each having a fourth multi-layered structure of Ta(5 nm)/NiFe(8 nm)/Co(1 nm)/Cu(3 nm)/Co(4 nm)/PtMn(25 nm)/Ta(5 nm) are formed, and then the pin anneal process and the free layer anneal process are performed before formation of the inductive write elements.

As shown in FIG. 14, an upper shield layer is deposited on the formed SVMR elements on the wafer (step S11). Then, the pin anneal process is performed (step S12). In the pin anneal process, the wafer is heated at a temperature of about 260° C. and sustained it for almost 5 hours, under application of magnetic field of about 3 kOe toward the pinned direction which is perpendicular to the track width direction. Then, the heat treatment temperature is decreased, under the application of the magnetic field. During this temperature decreasing period, since the temperature lowers less than the blocking temperature of the anti-ferromagnetic material under application of the magnetic field toward pinning direction, exchange couplings between the pinned layer of ferromagnetic material 42 and the anti-ferromagnetic layer 43 are generated. The exchange coupling bias magnetic field $H_{EX}$ obtained in this fifth embodiment is $H_{EX}$=481 Oe.

Then, the free layer anneal process is performed (step S13). In this free layer anneal process, the wafer is heated at a temperature of about 145° C., sustained it for almost 5 hours and then decreased, under application of magnetic field of about 200 Oe toward the track width direction, namely toward the direction of bias magnetic field from the permanent magnet for controlling the magnetic domain of the free layer.

Thereafter, the inductive element is formed on the upper shield layer (step S14). The following manufacturing processes are the same as these of the conventional manufacturing method.

The rotated angle of the pinned direction caused by the free layer annealing according to this embodiment was 3 degrees. The output degradation of the SVMR element due to this pinned direction rotation (first stage degradation) was 0.2%.

On the other hand, the heat-resistant test for leaving the SVMR element at the temperature of 150° C. was performed in order to know the degradation with lapse of time when the SVMR element after the free layer annealing of this embodiment would be actually used under the application of heat and magnetic field. The result is shown in Table 5 and FIG. 15 (145° C.—200 Oe). The numeric values in Table 5 indicate the ratio of output degradation (%).

It will be noted from this heat-resistant test that the output degradation of the SVMR element left at 150° C. for 1000 hours (degradation with lapse of time) was 3.8%. Therefore, the ratio of a total degradation which is the sum of the output degradation ratio with lapse of time and the first stage degradation ratio of the SVMR element became 4.0%.

TABLE 5

Ta (5 nm)/NiFe (8 nm)/Co (1 nm)/Cu (3 nm)/
Co (4 nm)/PtMn (25 nm)/Ta (5 nm)

| Free Layer Annealing | Initial | Left for 5 hours | Left for 12 hours | Left for 24 hours | Left for 100 hours | Left for 500 hours | Left for 1000 hours |
|---|---|---|---|---|---|---|---|
| No Annealing | 0 | −6.2 | −8.2 | −9.0 | −9.8 | −10.8 | −11.3 |
| 220° C. 200 Oe | 0 | −1.0 | −1.1 | −1.2 | −1.2 | −1.3 | −1.4 |
| 145° C. 200 Oe | 0 | −2.0 | −2.7 | −3.0 | −3.3 | −3.5 | −3.8 |
| 125° C. 200 Oe | 0 | −2.6 | −3.4 | −3.4 | −4.0 | −4.3 | −4.7 |

As a modification of this embodiment, a SVMR element with the same fourth multi-layered structure but only the conditions of the free layer annealing are changed is explained hereinafter.

In this free layer anneal process, the wafer is heated at a temperature of about 125° C., sustained it for almost 10 hours and then decreased, under application of magnetic field of about 200 Oe toward the track width direction, namely toward the direction of bias magnetic field from the permanent magnet for controlling the magnetic domain of the free layer.

The rotated angle of the pinned direction caused by the free layer annealing according to this modification was 1 degrees. The output degradation of the SVMR element due to this pinned direction rotation (first stage degradation) was 0.1%. As will be noted from Table 5 and FIG. 15 (125° C.—200 Oe), the heat-resistant test resulted that the output degradation of the SVMR element left at 150° C. for 1000 hours (degradation with lapse of time) was 4.7%. Therefore, the ratio of a total degradation which is the sum of the output degradation ratio with lapse of time and the first stage degradation ratio of the SVMR element became 4.8%.

As a first comparison example against this embodiment, a SVMR element with the same fourth multi-layered structure but only the conditions of the free layer annealing are changed is explained hereinafter.

In this free layer anneal process, the wafer is heated at a temperature of about 220° C., sustained it for almost 2 hours and then decreased, under application of magnetic field of about 200 Oe toward the track width direction, namely toward the direction of bias magnetic field from the permanent magnet for controlling the magnetic domain of the free layer.

The rotated angle of the pinned direction caused by the free layer annealing according to this comparison example was 16 degrees. The output degradation of the SVMR element due to this pinned direction rotation (first stage degradation) was 6.0%. As will be noted from Table 5 and FIG. 15 (220° C.—200 Oe), the heat-resistant test resulted that the output degradation of the SVMR element left at 150° C. for 1000 hours (degradation with lapse of time) was 3.9%. Therefore, the ratio of a total degradation which is the sum of the output degradation ratio with lapse of time and the first stage degradation ratio of the SVMR element became 5.3%.

As a second comparison example against this embodiment, a SVMR element with the same fourth multi-layered structure but no free layer annealing is performed is explained hereinafter.

The rotated angle of the pinned direction according to this comparison example was 0 degrees. The output degradation of the SVMR element due to this pinned direction rotation (first stage degradation) was as a natural matter 0.0%. As will be noted from Table 5 and FIG. 15 (no free layer annealing), the heat-resistant test resulted that the output degradation of the SVMR element left at 150° C. for 1000 hours (degradation with lapse of time) was 11.3%. Therefore, the ratio of a total degradation which is the sum of the output degradation ratio with lapse of time and the first stage degradation ratio of the SVMR element became 11.3%.

Figure 15:
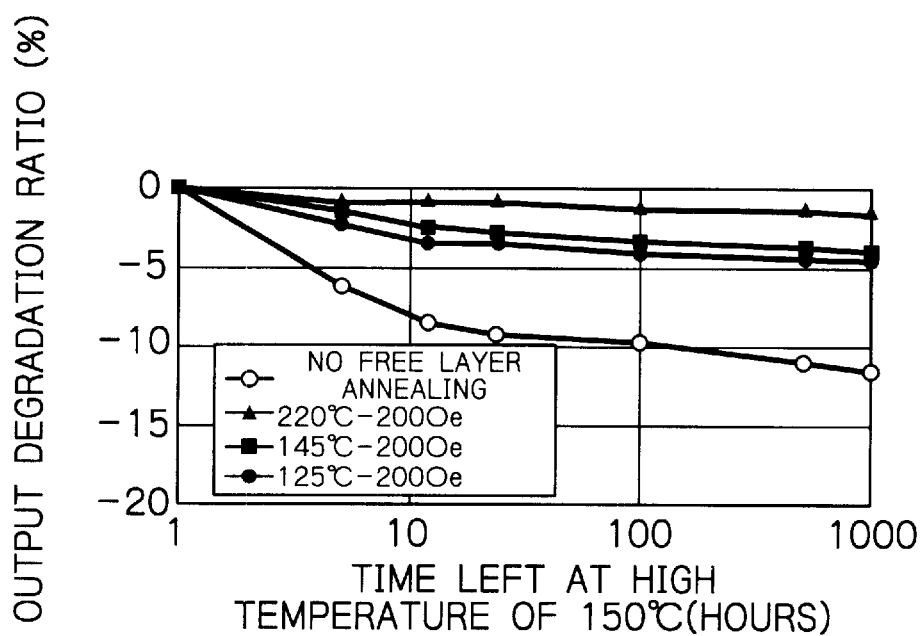
FIG. 15 is a graph illustrating a result of heat-resistant test of a SVMR element with a fourth multi-layered structure according to the fifth embodiment.

As aforementioned, Table 5 and FIG. 15 indicate the result of the heat-resistant test of the fifth embodiment, its modification, the first comparison example and the second comparison example which have the same fourth multi-layered structure. Also, Table 7 which will be described later indicates the first stage degradation ratio, the degradation ratio with lapse of time and the total degradation ratio of the SVMR element output.

Figure 16:
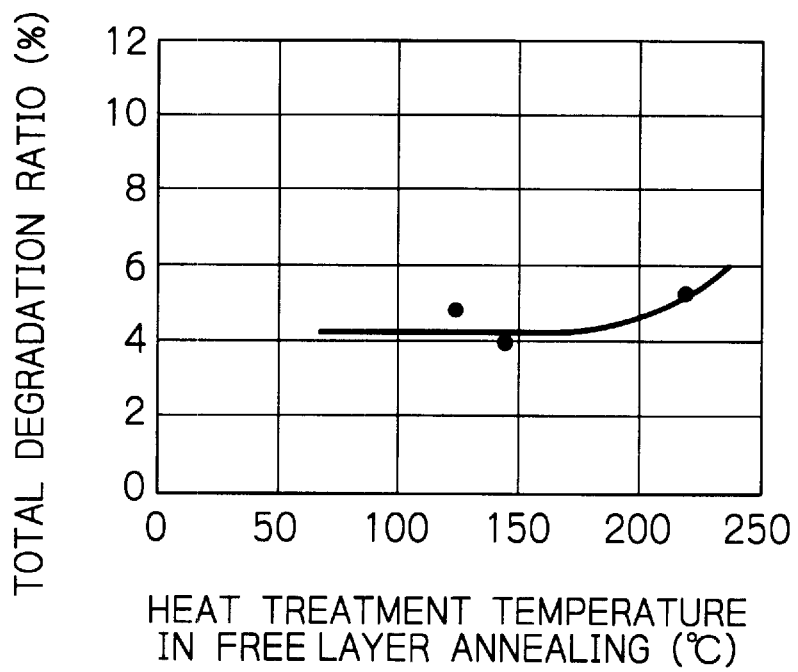
FIG. 16 is a graph illustrating a relationship between treatment temperature in the free layer annealing and total degradation ratio of the SVMR element with the fourth multi-layered structure according to the fifth embodiment.

FIG. 16 illustrates a relationship between treatment temperature in the free layer annealing and total degradation ratio of the above-mentioned SVMR elements with the fourth multi-layered structure.

As will be apparent from this figure, the total degradation ratio of the SVMR element output will be reduced if the treatment temperature of the free layer annealing becomes less than 150° C. However, in order to perform an effective free layer annealing, it is required to make the treatment temperature of the free layer annealing at 100° C. or more. Therefore, it is a key point that the free layer annealing should be performed at the treatment temperature of 100° C. or more but less than 150° C.

Another operations and advantages of this fifth embodiment are the same as those of the first embodiment.

Sixth Embodiment

As for a sixth embodiment according to the present invention, manufacturing processes of the composite type thin-film magnetic heads each of which consists of the SVMR element with the anti-ferromagnetic layer 43 made of PtMn and an inductive write element are described hereinafter. In this third embodiment, the SVMR elements each having a fifth multi-layered structure of Ta(5 nm)/PtMn (20 nm)/Co(4 nm)/Cu(3 nm)/Co(1 nm)/NiFe(9 nm)/Ta(5 nm) are formed, and then the pin anneal process and the free layer anneal process are performed before formation of the inductive write elements.

The manufacturing processes in this sixth embodiment are the same as those of the fifth embodiment except for the free layer anneal process. The exchange coupling bias magnetic field $H_{EX}$ obtained in this sixth embodiment is $H_{EX}$=523 Oe. Hereinafter, only the free layer anneal process is described in detail.

In the free layer anneal process of this sixth embodiment, the wafer is heated at a temperature of about 145° C., sustained it for almost 8 hours and then decreased, under application of magnetic field of about 500 Oe toward the track width direction, namely toward the direction of bias magnetic field from the permanent magnet for controlling the magnetic domain of the free layer.

The rotated angle of the pinned direction caused by the free layer annealing according to this embodiment was 6 degrees. The output degradation of the SVMR element due to this pinned direction rotation (first stage degradation) was 0.5%.

The heat-resistant test for leaving the SVMR element at the temperature of 150° C. was performed in order to know the degradation with lapse of time when the SVMR element after the free layer annealing of this embodiment would be actually used under the application of heat and magnetic field. The result is shown in Table 6 and FIG. 17 (145° C.—500 Oe). The numeric values in Table 6 indicate the ratio of output degradation (%).

It will be noted from this heat-resistant test that the output degradation of the SVMR element left at 150° C. for 1000 hours (degradation with lapse of time) was 3.5%. Therefore, the ratio of a total degradation which is the sum of the output degradation ratio with lapse of time and the first stage degradation ratio of the SVMR element became 4.0%.

TABLE 6

Ta (5 nm)/PtMn (20 nm)/Co (4 nm)/Cu (3 nm)/
Co (1 nm)/NiFe (9 nm)/Ta (5 nm)

| Free Layer Annealing | Initial | Left for 5 hours | Left for 12 hours | Left for 24 hours | Left for 100 hours | Left for 500 hours | Left for 1000 hours |
|---|---|---|---|---|---|---|---|
| No Annealing | 0 | −7.1 | −8.4 | −9.2 | −9.6 | −10.4 | −10.8 |
| 230° C. 500 Oe | 0 | −1.0 | −1.0 | −0.9 | −1.0 | −1.1 | −1.3 |
| 145° C. 500 Oe | 0 | −2.0 | −2.4 | −2.8 | −3.0 | −3.2 | −3.5 |
| 145° C. No Magnetic Field | 0 | −2.2 | −2.7 | −3.0 | −3.3 | −3.5 | −3.8 |
| 125° C. 500 Oe | 0 | −3.0 | −3.4 | −3.8 | −4.1 | −4.4 | −4.6 |

As a first modification of this embodiment, a SVMR element with the same fifth multi-layered structure but the free layer annealing is carried out without applying external magnetic field after hard magnets for controlling magnetic domain of the free layer are magnetized is explained hereinafter. Namely, in this free layer anneal process, the wafer is heated at a temperature of about 145° C., sustained it for almost 8 hours and then decreased under no application of the external magnetic field.

The rotated angle of the pinned direction caused by the free layer annealing according to this modification was 6 degrees. The output degradation of the SVMR element due to this pinned direction rotation (first stage degradation) was 0.5%. As will be noted from Table 6 and FIG. 17 (145° C.—no magnetic field), the heat-resistant test resulted that the output degradation of the SVMR element left at 150° C. for 1000 hours (degradation with lapse of time) was 3.8%. Therefore, the ratio of a total degradation which is the sum of the output degradation ratio with lapse of time and the first stage degradation ratio of the SVMR element became 4.3%.

As a second modification of this embodiment, a SVMR element with the same fifth multi-layered structure but only the conditions of the free layer annealing are changed is explained hereinafter.

In this free layer anneal process, the wafer is heated at a temperature of about 125° C., sustained it for almost 10 hours and then decreased, under application of magnetic field of about 500 Oe toward the track width direction, namely toward the direction of bias magnetic field from the permanent magnet for controlling the magnetic domain of the free layer.

The rotated angle of the pinned direction caused by the free layer annealing according to this modification was 2 degrees. The output degradation of the SVMR element due to this pinned direction rotation (first stage degradation) was 0.1%. As will be noted from Table 6 and FIG. 17 (125° C.—500 Oe), the heat-resistant test resulted that the output degradation of the SVMR element left at 150° C. for 1000 hours (degradation with lapse of time) was 4.6%. Therefore, the ratio of a total degradation which is the sum of the output degradation ratio with lapse of time and the first stage degradation ratio of the SVMR element became 4.7%.

As a first comparison example against this embodiment, a SVMR element with the same fifth multi-layered structure but only the conditions of the free layer annealing are changed is explained hereinafter.

In this free layer anneal process, the wafer is heated at a temperature of about 230° C., sustained it for almost 1 hour and then decreased, under application of magnetic field of about 500 Oe toward the track width direction, namely toward the direction of bias magnetic field from the permanent magnet for controlling the magnetic domain of the free layer.

The rotated angle of the pinned direction caused by the free layer annealing according to this comparison example was 18 degrees. The output degradation of the SVMR element due to this pinned direction rotation (first stage degradation) was 4.9%. As will be noted from Table 6 and FIG. 17 (230° C.—500 Oe), the heat-resistant test resulted that the output degradation of the SVMR element left at 150° C. for 1000 hours (degradation with lapse of time) was 1.3%. Therefore, the ratio of a total degradation which is the sum of the output degradation ratio with lapse of time and the first stage degradation ratio of the SVMR element became 6.2%.

As a second comparison example against this embodiment, a SVMR element with the same fifth multi-layered structure but no free layer annealing is performed is explained hereinafter.

The rotated angle of the pinned direction according to this comparison example was 0 degrees. The output degradation of the SVMR element due to this pinned direction rotation (first stage degradation) was as a natural matter 0.0%. As will be noted from Table 6 and FIG. 17 (no free layer annealing), the heat-resistant test resulted that the output degradation of the SVMR element left at 150° C. for 1000 hours (degradation with lapse of time) was 10.8%. Therefore, the ratio of a total degradation which is the sum of the output degradation ratio with lapse of time and the first stage degradation ratio of the SVMR element became 10.8%.

Figure 17:
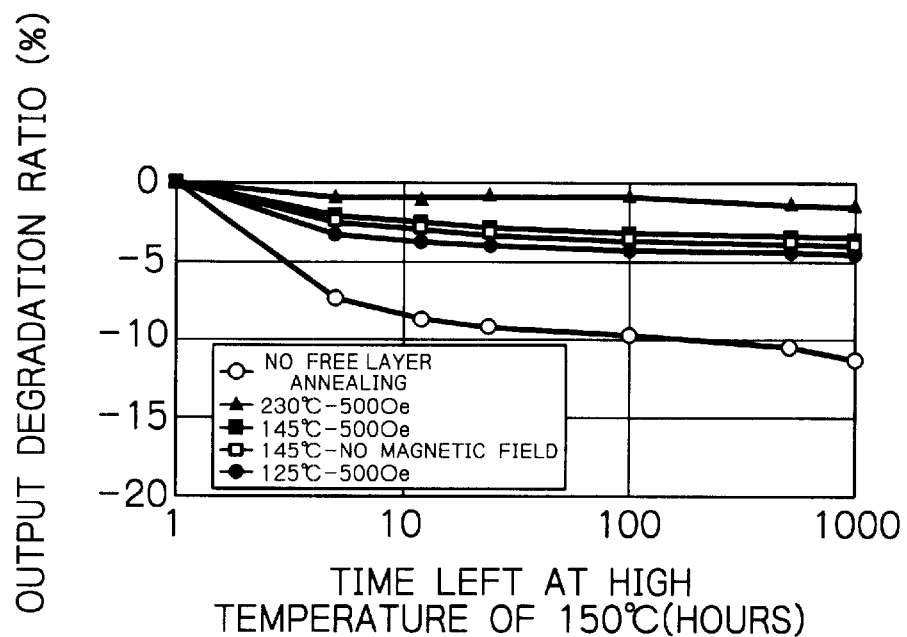
FIG. 17 is a graph illustrating a result of heat-resistant test of a SVMR element with a fifth multi-layered structure according to the sixth embodiment.

As aforementioned, Table 6 and FIG. 17 indicate the result of the heat-resistant test of the sixth embodiment, its modification, the first comparison example and the second comparison example which have the same fifth multi-layered structure. Also, Table 7 which will be described later indicates the first stage degradation ratio, the degradation ratio with lapse of time and the total degradation ratio of the SVMR element output.

Figure 18:
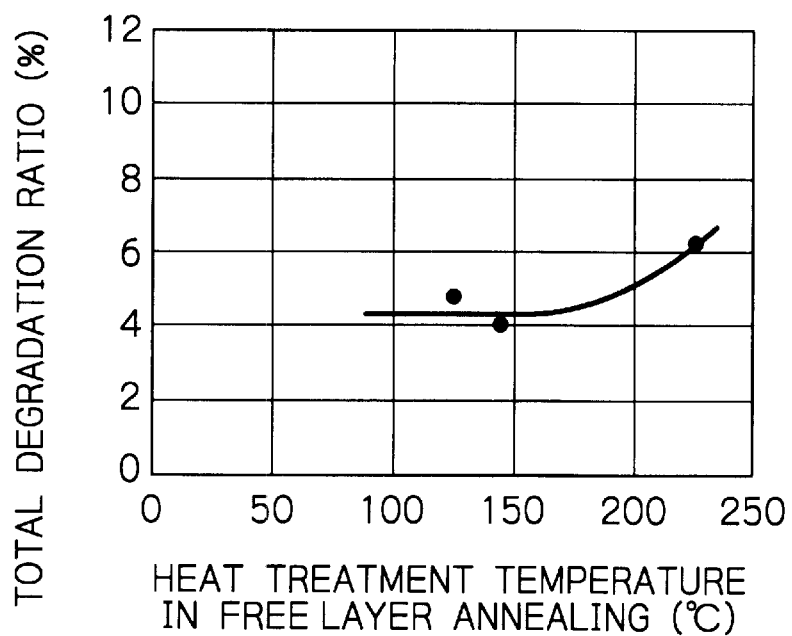
FIG. 18 is a graph illustrating a relationship between treatment temperature in the free layer annealing and total degradation ratio of the SVMR element with the fifth multi-layered structure according to the sixth embodiment.

FIG. 18 illustrates a relationship between treatment temperature in the free layer annealing and total degradation ratio of the above-mentioned SVMR elements with the fifth multi-layered structure.

As will be apparent from this figure, the total degradation ratio of the SVMR element output will be reduced if the treatment temperature of the free layer annealing becomes less than 150° C. However, in order to perform an effective free layer annealing, it is required to make the treatment temperature of the free layer annealing at 100° C. or more. Therefore, it is a key point that the free layer annealing should be performed at the treatment temperature of 100° C. or more but less than 150° C.

Another operations and advantages of this sixth embodiment are the same as those of the fifth embodiment.

Table 7 represents the first stage degradation ratio, the degradation ratio with lapse of time and the total degradation ratio of the SVMR element output in the aforementioned various embodiments.

TABLE 7

| Layer Structure | Pin Annealing | Free Layer Annealing | Deterioration Ratio Left for 1000 hours (%) | Rotation Angle of Pinned Direction (°) | Deterioration Ratio by Pinned Direction Rotation (%) | Total Deterioration Ratio (%) |
|---|---|---|---|---|---|---|
| Ta (5 nm)/ | 260° C. | No Annealing | 13.0 | 0 | 0.0 | 13.0 |
| NiFe (8 nm)/ | 3 kOe | 125° C. | 4.6 | 5 | 0.3 | 4.9 |
| Co (1 nm)/ | 2 hours | 200 Oe | | | | |
| Cu (2.7 nm)/ | | 10 hours | | | | |
| Co (4 nm)/ | | 145° C. | 2.3 | 12 | 2.2 | 4.5 |
| RuRhMn (11 nm)/ | | 200 Oe | | | | |
| Ta (5 nm) | | 5 hours | | | | |
| | | 170° C. | 1.3 | 20 | 6.0 | 7.3 |
| | | 200 Oe | | | | |
| | | 2 hours | | | | |
| Ta (5 nm)/ | 260° C. | No Annealing | 12.0 | 0 | 0.0 | 12.0 |
| NiFe (8 nm)/ | 3 kOe | 125° C. | 7.2 | 6 | 0.5 | 7.7 |
| Co (1 nm)/ | 2 hours | 100 Oe | | | | |
| Cu (2.7 nm)/ | | 6 hours | | | | |
| Co (4 nm)/ | | 145° C. | 4.0 | 13 | 2.6 | 6.6 |
| RuRhMn (15 nm)/ | | 100 Oe | | | | |
| Ta (5 nm) | | 4 hours | | | | |
| | | 200° C. | 2.0 | 22 | 7.3 | 9.3 |
| | | 100 Oe | | | | |
| | | 2 hours | | | | |
| Ta (5 nm)/ | 260° C. | No Annealing | 17.4 | 0 | 0.0 | 17.4 |
| NiFe (8 nm)/ | 3 kOe | 125° C. | 6.2 | 3 | 0.1 | 6.3 |
| Co (1 nm)/ | 2 hours | 100 Oe | | | | |
| Cu (2.5 nm)/ | | 8 hours | | | | |
| Co (4 nm)/ | | 145° C. | 4.8 | 6 | 0.5 | 5.3 |
| RuMn (12 nm)/ | | 100 Oe | | | | |
| Ta (5 nm) | | 6 hours | | | | |
| | | 145° C. | 3.6 | −6 | 0.5 | 4.1 |
| | | 100 Oe | | | | |
| | | 6 hours | | | | |
| | | 180° Rotated | | | | |
| | | 160° C. | 3.8 | 17 | 4.5 | 8.3 |
| | | 100 Oe | | | | |
| | | 2 hours | | | | |

TABLE 7-continued

| Layer Structure | Pin Annealing | Free Layer Annealing | Deterioration Ratio Left for 1000 hours (%) | Rotation Angle of Pinned Direction (°) | Deterioration Ratio by Pinned Direction Rotation (%) | Total Deterioration Ratio (%) |
|---|---|---|---|---|---|---|
| Ta (5 nm)/ | 260° C. | No Annealing | 11.3 | 0 | 0.0 | 11.3 |
| NiFe (8 nm)/ | 3 kOe | 125° C. | 4.7 | 1 | 0.1 | 4.8 |
| Co (1 nm)/ | 5 hours | 200 Oe | | | | |
| Cu (3 nm)/ | | 10 hours | | | | |
| Co (4 nm)/ | | 145° C. | 3.8 | 3 | 0.2 | 4.0 |
| PtMn (25 nm)/ | | 200 Oe | | | | |
| Ta (5 nm) | | 5 hours | | | | |
| | | 220° C. | 1.4 | 16 | 3.9 | 5.3 |
| | | 200 Oe | | | | |
| | | 2 hours | | | | |
| Ta (5 nm)/ | 260° C. | No Annealing | 10.8 | 0 | 0.0 | 10.8 |
| PtMn (20 nm)/ | 3 kOe | 125° C. | 4.6 | 2 | 0.1 | 4.7 |
| Co (4 nm)/ | 5 hours | 500 Oe | | | | |
| Cu (3 nm)/ | | 10 hours | | | | |
| Co (1 nm)/ | | 145° C. | 3.5 | 6 | 0.5 | 4.0 |
| NiFe (9 nm)/ | | 500 Oe | | | | |
| Ta (5 nm) | | 8 hours | | | | |
| | | 145° C. | | | | |
| | | No Magnetic Field | 3.8 | 6 | 0.5 | 4.3 |
| | | 8 hours | | | | |
| | | 230° C. | 1.3 | 18 | 4.9 | 6.2 |
| | | 500 Oe | | | | |
| | | 1 hours | | | | |

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of manufacturing a thin-film magnetic head with a spin valve magnetoresistive effect element which includes first and second layers of a ferromagnetic material separated by a layer of non-magnetic electrically conductive material, and a layer of anti-ferromagnetic material formed in physical contact with the second ferromagnetic material layer, said method comprising:

a first temperature annealing step of annealing said spin valve magnetoresistive effect element under application of magnetic field to provide exchange coupling between said second ferromagnetic material layer and said anti-ferromagnetic material layer so that said second ferromagnetic material layer is pinned toward a predetermined direction; and a second temperature annealing step of annealing said spin valve magnetoresistive effect element so that axis of easy magnetization of said first ferromagnetic material layer orients a direction substantially perpendicular to said predetermined direction, wherein said second temperature annealing is performed at a temperature equal to or higher than 100° C. but lower than 150° C.

2. The method as claimed in claim 1, wherein said second temperature annealing is performed under application of magnetic field in a direction substantially perpendicular to said predetermined direction.

3. The method as claimed in claim 2, wherein said second temperature annealing is performed under application of external magnetic field of 500 Oe or less.

4. The method as claimed in claim 1, wherein said second temperature annealing is performed after said first temperature annealing is done.

5. The method as claimed in claim 1, wherein said method further comprises a step of forming of bias providing means for applying magnetic domain control field to said first ferromagnetic material layer, and wherein said second temperature annealing is performed under no application of external magnetic field after forming said bias providing means.

6. The method as claimed in claim 5, wherein said second temperature annealing is performed after said first temperature annealing is done.

7. The method as claimed in claim 1, wherein said second temperature annealing is performed for 1–10 hours.

8. A method of manufacturing a thin-film magnetic head with a spin valve magnetoresistive effect element which includes first and second layers of a ferromagnetic material separated by a layer of non-magnetic electrically conductive material, and a layer of anti-ferromagnetic material formed in physical contact with the second ferromagnetic material layer, said method comprising:

a step of forming of bias providing means for applying magnetic domain control field to said first ferromagnetic material layer;

a first temperature annealing step of annealing said spin valve magnetoresistive effect element under application of magnetic field to provide exchange coupling between said second ferromagnetic material layer and said anti-ferromagnetic material layer so that said second ferromagnetic material layer is pinned toward a predetermined direction; and a second temperature annealing step of annealing said spin valve magnetoresistive effect element so that axis of easy magnetization of said first ferromagnetic material layer orients a direction substantially perpendicular to said predetermined direction, said second temperature annealing being performed at a temperature lower than 150° C., said second temperature annealing being performed under no application of external magnetic field after forming said bias providing means.

9. The method as claimed in claim 8, wherein said second temperature annealing is performed under application of magnetic field in a direction substantially perpendicular to said predetermined direction before forming said bias providing means.

10. The method as claimed in claim 9, wherein said second temperature annealing is performed under application of external magnetic field of 500 Oe or less before forming said bias providing means.

11. The method as claimed in claim 8, wherein said second temperature annealing is performed after said first temperature annealing is done.

12. The method as claimed in claim 8, wherein said second temperature annealing is performed for 1–10 hours.

* * * * *